(12) United States Patent
Goering

(10) Patent No.: US 6,733,862 B2
(45) Date of Patent: May 11, 2004

(54) REINFORCED ARTICLE AND METHOD OF MAKING

(75) Inventor: Jonathan Goering, York, ME (US)

(73) Assignee: Albany International Techniweave, Inc., Rochester, NH (US)

( * ) Notice: Subject to any disclaimer, the term of this patent is extended or adjusted under 35 U.S.C. 154(b) by 22 days.

(21) Appl. No.: 09/749,318

(22) Filed: Dec. 27, 2000

(65) Prior Publication Data

US 2002/0081925 A1 Jun. 27, 2002

(51) Int. Cl.⁷ .............................. D05D 25/00
(52) U.S. Cl. .................. 428/121; 428/124; 428/130; 442/203; 442/205; 139/1 R; 139/384
(58) Field of Search ................... 139/1 R, 384; 442/181, 203, 215, 205; 428/121, 124, 130

(56) References Cited

U.S. PATENT DOCUMENTS

| | | |
|---|---|---|
| 3,623,924 A | 11/1971 | De Winter et al. |
| 4,725,485 A | 2/1988 | Hirokawa |
| 4,906,506 A | 3/1990 | Nishimura et al. |
| 4,922,968 A | 5/1990 | Bottger et al. |
| 5,064,705 A | 11/1991 | Donovan, Sr. |
| 5,100,713 A | 3/1992 | Homma et al. |
| 5,521,000 A | 5/1996 | Owens |
| 5,817,409 A | * 10/1998 | Stephan et al. .............. 428/219 |
| 6,412,325 B1 | 7/2002 | Croswell |

FOREIGN PATENT DOCUMENTS

| | | |
|---|---|---|
| DE | G 88 02 711.2 | 3/1988 |
| DE | 197 16 637 A1 | 4/1997 |
| DE | 198 05 456 A1 | 11/1998 |
| EP | 0 243 105 A1 | 10/1987 |
| EP | 426158 | * 4/1992 |
| EP | 0 683 035 A1 | 11/1995 |
| GB | 854 222 | 11/1960 |
| GB | 1 205 275 | 3/1968 |

OTHER PUBLICATIONS

International Search Report prepared by EPO and issued for PCT/US01/49520; mailed Jul. 9, 2002.

* cited by examiner

Primary Examiner—Elizabeth M. Cole
(74) Attorney, Agent, or Firm—Frommer Lawrence & Haug LLP; Ronald R. Santucci

(57) ABSTRACT

A fabric for providing reinforcement and the like which is made from a two dimensional flat fabric which included woven and unwoven portions that allow the fabric to be folded to create a three dimensional structure without the need for cutting and darting.

23 Claims, 3 Drawing Sheets

REINFORCED ARTICLE AND METHOD OF MAKING

FIELD OF THE INVENTION

The present invention relates to a woven substrate which is formed into a three dimensional article by thermoforming or other means suitable for purpose.

BACKGROUND OF THE INVENTION

Fiber reinforced composite structures enjoy the benefit of being lightweight while providing mechanical advantages such as strength. However, in many applications, molded plastic, wood or metal structures are preferred due to the cost involved, since they are relatively easy to fabricate. Often times however, articles, such as package or storing crates, are prone to damage due to the rough handling involved or are limited in their stacking ability due to weight and strength considerations. While fiber reinforced composite structures would be more desirable, the expense involved in making a somewhat complex three dimensional (3D) structure is a consideration.

This is because composite structures start off typically with a woven flat substrate of fibers. The substrate then has to be shaped into the form of the article which is then coated with a resin and thermoformed or cured in the desired shape. This may be readily done for relatively flat or smooth surfaces. However, for angled surfaces such as at the junction of the sides, corners and bottoms of a box or crate, cutting or darting is required. This is somewhat labor intensive and adds to the cost of manufacture. For things typically considered to be inexpensive, for example a packaging crate, the added expense may outweigh the benefits of it being reinforced.

While woven 3D structures may be woven by specialized machines, the expense involved is considerable and rarely is it desirable to have a weaving machine dedicated to creating a simple structure.

Accordingly, while woven fiber reinforced articles are desirable in many applications to replace comparable plastic, wood or metal structures, there exists a need to reduce the cost involved in the method of their manufacture. By doing so it may also allow for their relative mass production and wide spread application.

SUMMARY OF THE INVENTION

It is therefore a principal object of the invention to minimize or eliminate the need to cut and dart woven reinforcing fabrics for 3D structures.

It is a further object as part of this to simplify the manufacture of such structures and reduce the labor requirement.

A yet further object of the invention is to avoid the need for special weaving equipment to create 3D structures.

A still further object is to provide for a method of creating a woven reinforcing fabric which may be readily adapted to create a wide variety of different 3D structures.

These and other objects and advantages will be apparent from the present invention. The present invention is directed toward providing a specially designed fabric suitable as the reinforcement for a 3D composite structure. The fiber reinforcement is one that may be woven on conventional weaving machinery. It starts off as a woven 2D structure that is then formed into a 3D structure, particularly one having deep draws. To provide for this, the reinforcing fabric is woven in a manner that, in portions of the weave, the warp and weft or fill fibers are laid on each other and do not interlock. In this portion the fibers can move independently and slide past one another when the fabric is drawn or folded into shape. If the portion is a rectangular or square shape, it can be collapsed in such a manner that both the warp and weft fibers fold upon themselves and each other to align in an unidirectional manner which creates a corner which acts as a compression column in the final structure.

BRIEF DESCRIPTION OF THE DRAWINGS

Thus by the present invention its objects and advantages will be realized the description of which should be taken and in conjunction with the drawings wherein.

DETAILED DESCRIPTION OF THE PREFERRED EMBODIMENT

Figure 1:
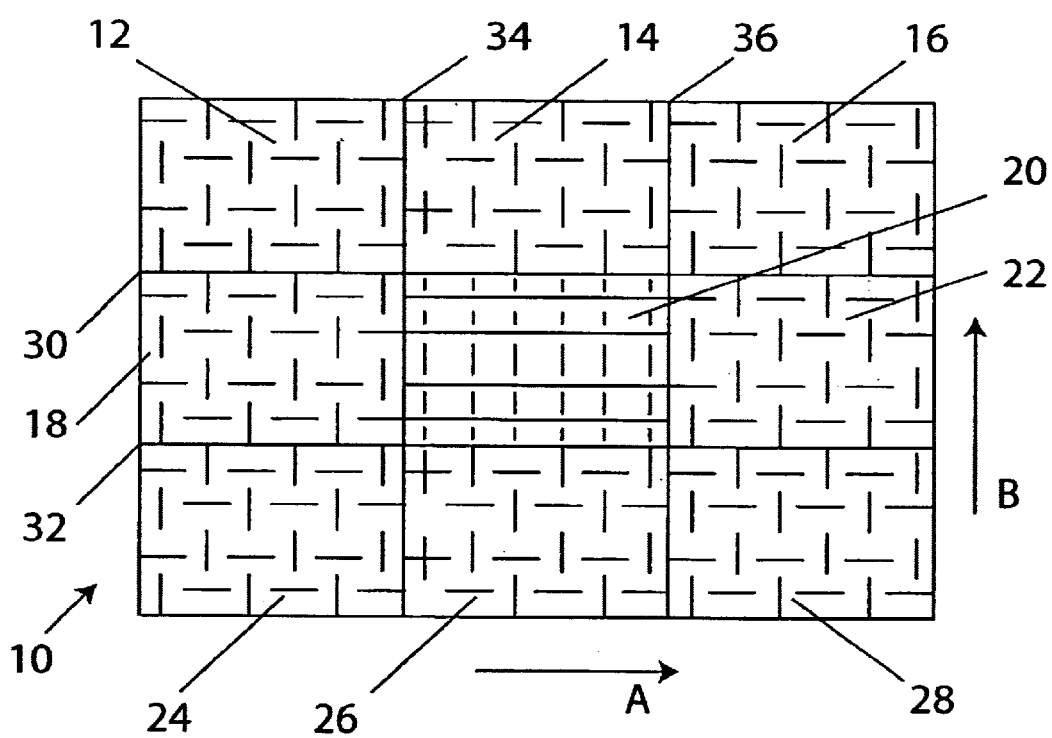
FIG. 1 illustrates the construction of a flat 2D woven fabric incorporating the teachings of the present invention.

Turning now more particularly to the drawings, like parts will be similarly numbered. In FIG. 1, there is shown a flat 2D woven reinforcement fabric 10 which illustrates the present invention. The fabric 10 may be woven using any conventional textile pattern such as plain, satin, twill, etc. or any other pattern suitable for this purpose. The fiber used can be any fiber that can be woven, synthetic or natural, including for example fibers made from glass, Kevlar®, carbon, nylon, rayon, polyester, cotton, etc. and may be woven on conventional weaving equipment.

In FIG. 1, the warp fibers are shown in direction A with the weft fibers in direction B. For purposes of this illustration the fabric 10 has been divided into regions 12 through 28 divided along fold lines 30–36. In regions 12–18 and 22–28 the fibers are woven in a conventional fashion with the warp fibers intersecting with the weft fibers. In region 20 these fibers do not interlock, in other words the weft fibers float beneath the warp fibers. In region 20 the fibers can therefore move independent of one another.

Once the fabric 10 is constructed, it can then be formed into the desired shape. If it is to act as a reinforcing structure, the fabric can be impregnated with the desired material or resin and then formed or thermoformed into shape. Alternatively, co-mingled tows consisting of a structural fiber and a thermoplastic resin could be woven to produce a preform which is then thermoformed.

Figures 2A, 2B, 2C, 2D:
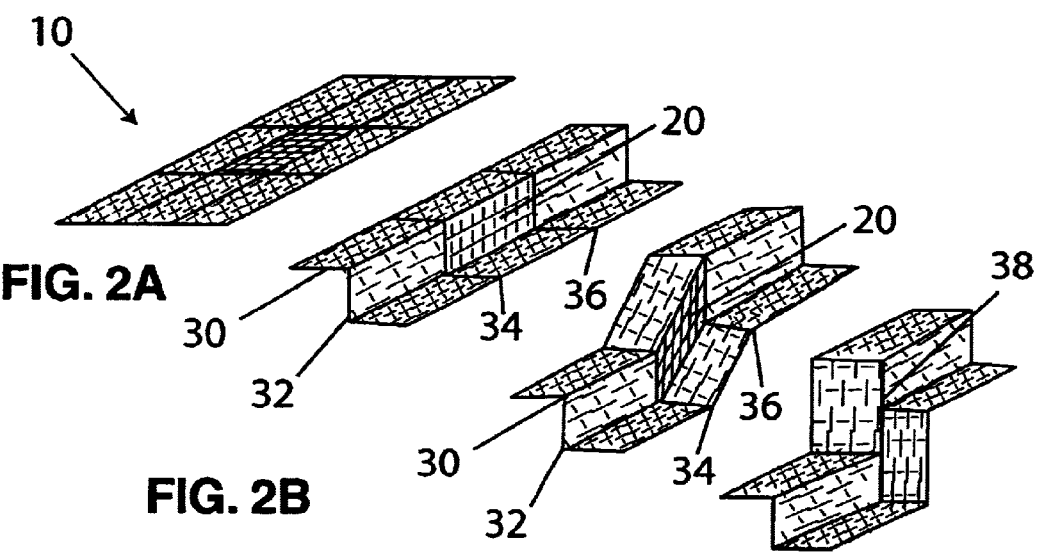
FIGS. 2A–2D illustrates the sequence of folding or drawing down the fabric to produce deep draws.

Turning now to FIGS. 2A–2D, shown in FIG. 2A is the flat 2D woven fabric 10. The fabric 10 is then folded along fold lines 30 and 32 which are parallel to the warp fibers, as shown in FIG. 2B. The fabric 10 is then folded along fold lines 32 and 36 which are parallel to the weft fibers and perpendicular to the warp fibers, as shown in FIG. 2C. In this process since the warp and weft fiber in region 20 are not interlocked, they slide past one another and ultimately accumulate in corner 38 as shown in FIG. 2D. The fibers in corner 38 are now unidirectional and can act as a compression column and increase the strength of the structure being formed. The foregoing can be done automatically by thermoforming equipment having the desired shaped mold, or by other means suitable for this purpose; then the structure heat set or cured.

The foregoing advantageously avoids the need for cutting or darting, thereby reducing the amount of labor required and the ultimate cost of the article. The present invention allows for the increased automation of the fabrication and therefore broadens the applications for which reinforced structures may be used.

Figure 3:
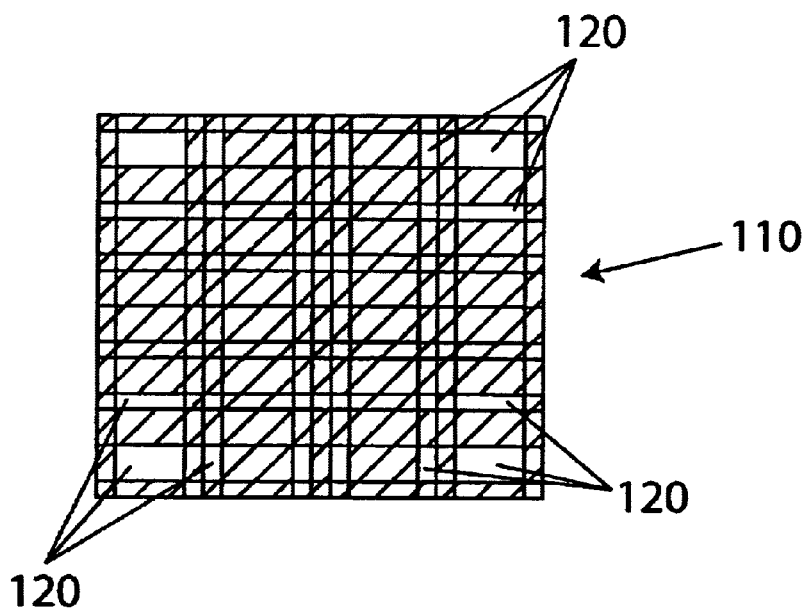
FIG. 3 illustrates a 2D fabric having multiple areas where warp and weft fibers are not interwoven to create a complex structure upon folding or drawing down.
Figure 4:
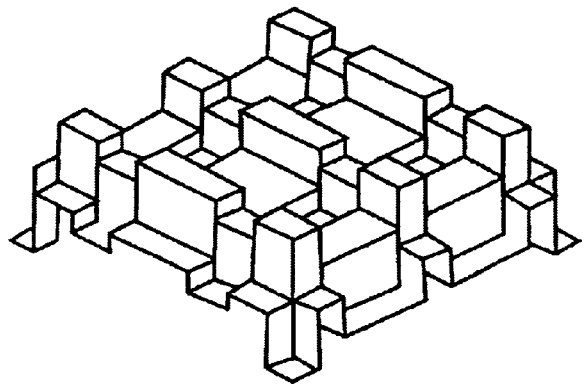
FIG. 4 is a perspective view of a 3D structure formed from the fabric shown in FIG. 3.

Turning now briefly to FIG. 3 there is shown a flat woven 2D fabric 110. Fabric 110 illustrates a plurality of regions 120 wherein in the woven structure, the warp fibers merely lay on the weft fibers. With such a fabric 110, it may be folded and shaped into a complex reinforced structure 130 as shown in FIG. 4. Of course other shapes can be created by varying the size and location of the regions where the warp and weft fibers do not interlock.

Thus by the present invention its objects and advantages are realized and although a preferred embodiment has been disclosed and described in detail herein, its scope should not be limited thereby rather its scope should be determined by that of the appended claims.

What is claimed is:

1. A fabric for forming a structure having a three dimensional shape, said fabric comprising:
    warp and weft fibers which are woven in an interlocking fashion in a woven portion of the fabric;
    a plurality of adjacent warp fiber and a plurality of adjacent weft fibers in an unwoven portion of the fabric wherein the warp and weft fibers are not interlocked together and are allowed to move independent of one another; and
    whereas a folding of the fabric in a first direction parallel to the warp fibers and a second direction parallel to the weft fibers causes the unwoven portion to collapse by causing the warp and weft fibers in the unwoven portion to come into alignment with each other so as to be parallel with each other.

2. The fabric according to claim 1 wherein the unwoven portion is surrounded by the woven portion.

3. The fabric according to claim 1, which includes a plurality of woven portions and unwoven portions.

4. The fabric according to claim 3, wherein the unwoven portions are surrounded by woven portions.

5. The fabric according to claim 1, wherein a plurality of the warp or weft fibers are made from a combination of reinforcing fibers and other fibers made from thermoplastic resin.

6. The fabric according to claim 2, wherein a plurality of the warp or weft fibers are made from synthetic or natural material including glass, aramid, carbon, nylon, rayon, polyester or cotton.

7. The fabric according to claim 3 wherein a plurality of the warp or weft fibers are made from a combination of reinforcing fibers and other fibers made from thermoplastic resin.

8. The fabric according to claim 3, wherein a plurality of the warp or weft fibers are made from synthetic or natural material including glass, aramid, carbon, nylon, rayon, polyester or cotton.

9. The fabric according to claim 1, wherein the folding takes place at a junction formed between the woven portion and the unwoven portion.

10. A method of making a fabric for forming a structure having a three dimensional shape comprising the steps of:
    weaving warp and weft fibers to create a woven portion of the fabric where the warp and wet fibers interlock;
    forming an unwoven portion of the fabric where a plurality of adjacent warp fibers and a plurality of adjacent weft fibers do not interlock and are allowed to move independent of each other; and
    folding said fabric in such a manner so as to collapse the unwoven portion by causing the warp and weft fibers in the unwoven portion to come into alignment with each other so as to be parallel with each other.

11. The method according to claim 10 which includes the step of forming the fabric with the unwoven portion surrounded by the woven portion.

12. The method according to claim 10, which includes the step of forming the fabric with a plurality of woven portions and unwoven portions.

13. The method according to claim 12, which includes the step of forming the fabric with the unwoven portions surrounded by woven portions.

14. The method according to claim 10, which includes the step of forming the fabric with a plurality of the warp or weft fibers made from a combination of reinforcing fibers and other fibers made from thermoplastic resin.

15. The method according to claim 10, which includes the step of using warp or weft fibers made from synthetic or natural material including glass, aramid, carbon, nylon, rayon, polyester or cotton.

16. The method according to claim 12, which includes the step of forming the fabric with a plurality of the warp or weft fibers made from a combination of reinforcing fibers and other fibers made from thermoplastic resin.

17. The method according to claim 12, which includes the step of using warp or weft fibers made from synthetic or natural material including glass, aramid, carbon, nylon, rayon, polyester or cotton.

18. The method in accordance with claim 10 wherein the folding of the fabric occurs in a first direction parallel to the warp fibers and a second direction parallel to the weft fibers causes the unwoven portion to collapse by causing the warp and weft fibers in the unwoven portion to come into alignment with each other.

19. The method in accordance with claim 18 wherein the folding takes place at a junction formed between the woven portion and the unwoven portion.

20. The method in accordance with claim 14, wherein said fabric is contained in a three dimensional structure which is thermoformed into shape.

21. The method in accordance with claim 16, wherein said fabric is contained in a three dimensional structure which is thermoformed into shape.

22. The method in accordance with claim 14, wherein the fabric is thermoformed into the three dimensional shape.

23. The method in accordance with claim 16, wherein the fabric is thermoformed into the three dimensional shape.

* * * * *